(12) United States Patent
Pang

(10) Patent No.: US 12,415,625 B2
(45) Date of Patent: Sep. 16, 2025

(54) MICROMETEOROID AND DEBRIS PROTECTION SYSTEM FOR A THERMAL CONTROL SYSTEM ON A SPACECRAFT

(71) Applicant: The Boeing Company, Chicago, IL (US)

(72) Inventor: Anthony Pang, El Segundo, CA (US)

(73) Assignee: The Boeing Company, Arlington, VA (US)

( * ) Notice: Subject to any disclaimer, the term of this patent is extended or adjusted under 35 U.S.C. 154(b) by 484 days.

(21) Appl. No.: 17/372,124

(22) Filed: Jul. 9, 2021

(65) Prior Publication Data

US 2022/0089303 A1 Mar. 24, 2022

Related U.S. Application Data

(60) Provisional application No. 63/081,667, filed on Sep. 22, 2020.

(51) Int. Cl.
*B64G 1/56* (2006.01)
*B64G 1/22* (2006.01)
*B64G 1/50* (2006.01)
*B64G 1/54* (2006.01)

(52) U.S. Cl.
CPC ............... *B64G 1/56* (2013.01); *B64G 1/226* (2013.01); *B64G 1/506* (2013.01); *B64G 1/546* (2013.01)

(58) Field of Classification Search
CPC .......... B64G 1/56; B64G 1/226; B64G 1/503; B64G 1/506; B64G 1/58; B32B 17/10403; G02B 5/08–0875; G02B 5/281–282
See application file for complete search history.

(56) References Cited

U.S. PATENT DOCUMENTS

| | | | | |
|---|---|---|---|---|
| 4,738,304 A * | 4/1988 | Chalmers | ............... | F28F 27/00 165/41 |
| 5,215,824 A * | 6/1993 | Munro, III | .............. | B32B 27/08 428/458 |
| 5,283,592 A * | 2/1994 | Bogorad | .................. | B64G 1/54 343/DIG. 2 |
| 5,608,414 A * | 3/1997 | Amore | ..................... | H01Q 1/02 343/770 |
| 5,870,063 A * | 2/1999 | Cherrette | ............. | B64G 1/1007 343/DIG. 2 |
| 5,884,868 A * | 3/1999 | Long | ........................ | C09D 1/02 244/171.8 |
| 6,538,796 B1 * | 3/2003 | Swanson | .................. | B64G 1/50 359/290 |
| 7,143,813 B2 | 12/2006 | Delgado, Jr. et al. | | |
| 7,270,891 B2 * | 9/2007 | Roth | ..................... | B64G 1/226 204/192.1 |
| 7,465,500 B2 | 12/2008 | Yang et al. | | |
| 10,124,917 B2 * | 11/2018 | Gettle | ..................... | F41H 5/023 |

(Continued)

*Primary Examiner* — Tien Q Dinh
*Assistant Examiner* — William L Gmoser
(74) *Attorney, Agent, or Firm* — Harrity & Harrity, LLP

(57) ABSTRACT

Disclosed is a micrometeoroid and debris protection system (MDPS) for a thermal control system on a spacecraft. The MDPS comprises a radiator face-sheet, a truss attached to the radiator face-sheet, and a thermally transparent bumper disposed on the truss. The thermally transparent bumper shields the radiator face-sheet from micrometeoroids and debris and enables thermal transfer from the radiator face-sheet through the thermally transparent bumper.

20 Claims, 11 Drawing Sheets

(56) References Cited

U.S. PATENT DOCUMENTS

| | | | | |
|---|---|---|---|---|
| 2001/0000577 A1* | 5/2001 | Parise | ................ | G01J 5/28 |
| | | | | 136/201 |
| 2004/0155154 A1* | 8/2004 | Topping | ................ | G01K 11/14 |
| | | | | 374/E11.02 |
| 2005/0151021 A1* | 7/2005 | Hamilton | ................ | B64G 1/503 |
| | | | | 244/172.7 |
| 2017/0025992 A1* | 1/2017 | Atwater | ................ | B64G 1/428 |

\* cited by examiner

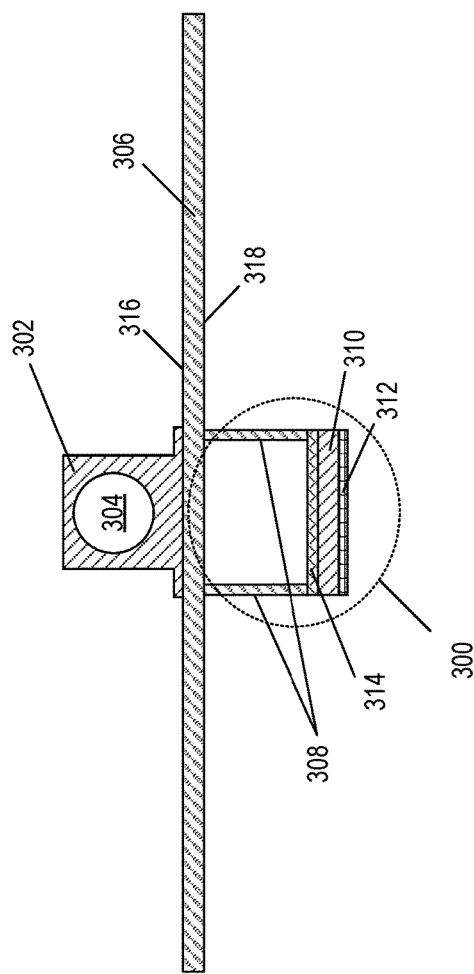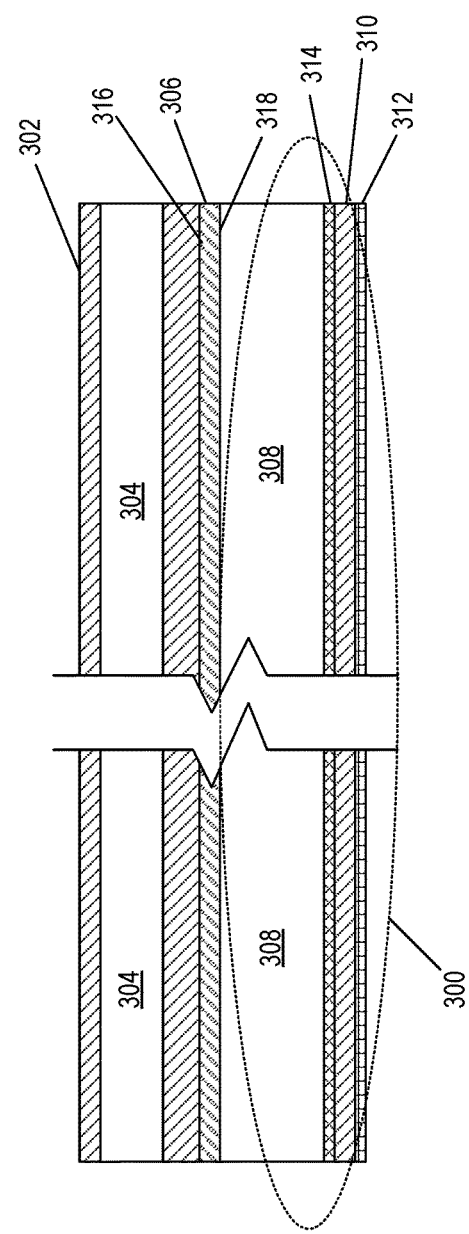

MICROMETEOROID AND DEBRIS PROTECTION SYSTEM FOR A THERMAL CONTROL SYSTEM ON A SPACECRAFT

CROSS REFERENCE TO RELATED APPLICATIONS

The present application claims priority to U.S. Provisional Patent Application Ser. No. 63/081,667, filed Sep. 22, 2020, which is hereby incorporated by reference in its entirety.

BACKGROUND

Technical Field

The field of the present disclosure relates generally to spacecraft thermal systems, and more specifically, to protection systems for thermal control systems on a spacecraft.

Prior Art

As modern spacecraft (such as satellites) increase their functionality so does their power consumption resulting in greater heat generation. This heat needs to be thermally controlled to not damage the payload systems on the spacecraft. At present, traditional thermal control systems utilize passive constant conductance heat-pipes (CCHP) and/or pumped fluid loop (PFL) systems for heat conductance distribution and optimized optical properties for radiative heat transfer.

In general, CCHP utilizes heat-pipes that are installed as a network of heat-pipes with both redundancy and typically discrete units embedded inside of a radiator panel of the spacecraft. Unfortunately, the uses of these types of heat-pipes generally adds resistance in thermal circuit of the thermal control system and results in limited fluid performance and/or phase change.

Use of PFL systems generally improves the thermal performance of a thermal control system but still introduces additional vulnerabilities. For example, a PFL system allows targeted heat extraction at a heat source on the spacecraft and significantly greater heat transfer (due to a forced convection heat exchange in a PFL system as compared to at CCHP) but PFL systems generally suffer from having single point failures problems. In a PFL system, without mitigation, a single leak in the PFL system can lead to a catastrophic failure due to the heat-pipe generally being continuous throughout the system.

In addition to the use of heat-pipes, these spacecrafts typically utilize passive thermal control systems on the outboard face-skin of the spacecraft. These thermal control systems include thermal control surfaces that include radiators (such as, for example, fixed or moveable radiator plates) with radiating surfaces such as, for example, mirrors that are attached to the heat-pipes that are embedded within an inboard face-skin of the spacecraft that is in thermal connection with the outboard face-skin. The heat produced by the electronic devices within the spacecraft are conducted to the radiator panel via the inboard face-skin, spread with the embedded heat-pipes, and dissipated into space via radiation through the outboard face-skin.

In a space environment, spacecraft are typically subject to micrometeoroid and/or debris strikes. As such, spacecraft utilizing PFL systems for cooling need to protect the thermal control systems from micrometeoroids, debris, and other impactful objects striking the spacecraft to keep the fluid from leaking from the heat-pipes within the PFL systems. Present solutions include adding metal (such as, for example, aluminum) protection between the face-sheet exterior of the spacecraft and the internal heat pipe. Unfortunately, this approach adds weight to the spacecraft that results in large costs in both designing and adding the addition metal protection and being able to lift the extra weight of the spacecraft into space.

Another known solution for micrometeoroid protection includes the use of Whipple shields (also known as Whipple bumpers) or monolithic shielding (i.e., the thickening of vulnerable layer below the outboard face-skin).

As an example, in FIG. 1A, a side-view of an example of an implementation of a known spacecraft thermal control system 100 is shown. The thermal control system 100 includes an in-board face-skin 102, outboard face-skin 104, honeycomb core 106, heat-pipe(s) 108, heat-pipe spacer(s) 110, shield 112, blanket 114, and plurality of standoffs 116. In this example, the spacecraft includes a plurality of electronic devices 118 that are in physical and thermal contact with the in-board face-skin 102. The electronic devices 118 produce heat that is passed from the electronic devices 118 to the outboard face-skin 104 via the heat-pipes 108 and the heat-pipe spacers 110. The heat-pipes 108 are fluid channels that may be, for example, approximately ⅜ of an inch in diameter and the heat-pipe spacers 110 are metal parts that space the heat-pipes 108 away from the in-board face-skin 102. As an example, the heat-pipe spacers may be constructed of Al 6063-TS3 aluminum and have a spacing 120 between the inner surface of the outboard face-skin 104 and the heat-pipe 108 of approximately about 0.365 inches.

In FIG. 1B, an expanded side-view 122 of the outboard face-skin 104, shield 112, blanket 114, and plurality of standoffs 116 is shown. In this view, a micrometeoroid is shown striking the shield 112 and punching a hole 124 through the shield 112. The resulting force of the impact breaks the micrometeoroid into smaller pieces that strike the blanket 114 with reduced force at impact points 126, 128, 130, 132, and 134. In this example, the blanket 114 stops the smaller pieces at impact points 126, 130, and 134, but some pieces penetrate the blanket 114 at impact points 128 and 132 and continue to impact the outboard face-skin 104 at impact point 136 and 138.

In this example, the shield 112, blanket 114, and plurality of standoffs 116 are supported by a plurality of support structures 140 attaching the plurality of standoffs 116 to the outboard face-skin 104. In this example, the shield 112 may be spaced approximately 2 inches from the outboard face-skin 104.

While these approaches provide some mechanical protection against micrometeoroid strikes, the bumper shields are typically in the form of opaque blankets. As an example, existing Whipple bumper shield designs use Nextel™ (from The 3M Company of Saint Paul, MN), Kevlar® (from the DuPoint de Nemours, Inc. of Wilmington, DE), or aluminum, and are not infrared transparent and, therefore, block radiative heat transfer from the spacecraft into space. The typical solution to this problem is to significantly increase the monolithic shielding (produced by the shield 112) and/or the material size of the heat-pipe spacers 110 and spacing 120 between an inner surface of the outboard face-skin 104 and the heat-pipe 108 resulting in heavy mass penalties for the spacecraft. As such, there is a need for an improved protection system for thermal control systems on a spacecraft.

SUMMARY

Disclosed is a micrometeoroid and debris protection system (MDPS) for a thermal control system on a spacecraft.

The MDPS comprises a radiator face-sheet, a truss attached to the radiator face-sheet, and a thermally transparent bumper disposed on the truss. The thermally transparent bumper shields the radiator face-sheet from micrometeoroids and debris and enables thermal transfer from the radiator face-sheet through the thermally transparent bumper.

Also disclosed is another MDPS for a thermal control system on a spacecraft. The thermal control system has a first heat-pipe and a second heat-pipe and the MDPS comprises a radiator face-sheet having an inner surface, wherein the first heat-pipe and the second heat-pipe are attached to the inner surface of the radiator face-sheet, a first truss and a second truss attached to an outer surface of the radiator face-sheet, and a first thermally transparent bumper disposed on the first truss and a second thermally transparent bumper disposed on the second truss. The first thermally transparent bumper and second thermally transparent bumper shield the radiator face-sheet from micrometeoroids and debris and enables thermal transfer from the radiator face-sheet through the first thermally transparent bumper and second thermally transparent bumper.

Additionally, disclosed is a method for manufacturing the MDPS. The method comprises attaching a truss to an outer surface of a radiator face-sheet, wherein the radiator face-sheet includes an inner surface attached to the thermal control system and the truss is positioned opposite a location of the thermal control system and attaching a thermally transparent bumper on to the truss.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 3A is a front-view of the MDPS shown in FIGS. 2A and 2B in accordance with the present disclosure.

FIG. 3B is a side-view of the MDPS shown in FIG. 3A in accordance with the present disclosure.

DETAILED DESCRIPTION

A micrometeoroid and debris protection system (MDPS) for a thermal control system on a spacecraft is disclosed. The MDPS comprises a radiator face-sheet, a truss attached to the radiator face-sheet, and a thermally transparent bumper disposed on the truss. The thermally transparent bumper shields the radiator face-sheet from micrometeoroids and debris and enables thermal transfer from the radiator face-sheet through the thermally transparent bumper.

Also disclosed is another MDPS for a thermal control system on a spacecraft. The thermal control system has a first heat-pipe and a second heat-pipe and the MDPS comprises a radiator face-sheet having an inner surface, wherein the first heat-pipe and the second heat-pipe are attached to the inner surface of the radiator face-sheet, a first truss and a second truss attached to an outer surface of the radiator face-sheet, and a first thermally transparent bumper disposed on the first truss and a second thermally transparent bumper disposed on the second truss. The first thermally transparent bumper and second thermally transparent bumper shield the radiator face-sheet from micrometeoroids and debris and enables thermal transfer from the radiator face-sheet through the first thermally transparent bumper and second thermally transparent bumper.

Additionally, disclosed is a method for manufacturing the MDPS. The method comprises attaching a truss to an outer surface of a radiator face-sheet, wherein the radiator face-sheet includes an inner surface attached to the thermal control system and the truss is positioned opposite a location of the thermal control system and attaching a thermally transparent bumper on to the truss.

Figure 1A:
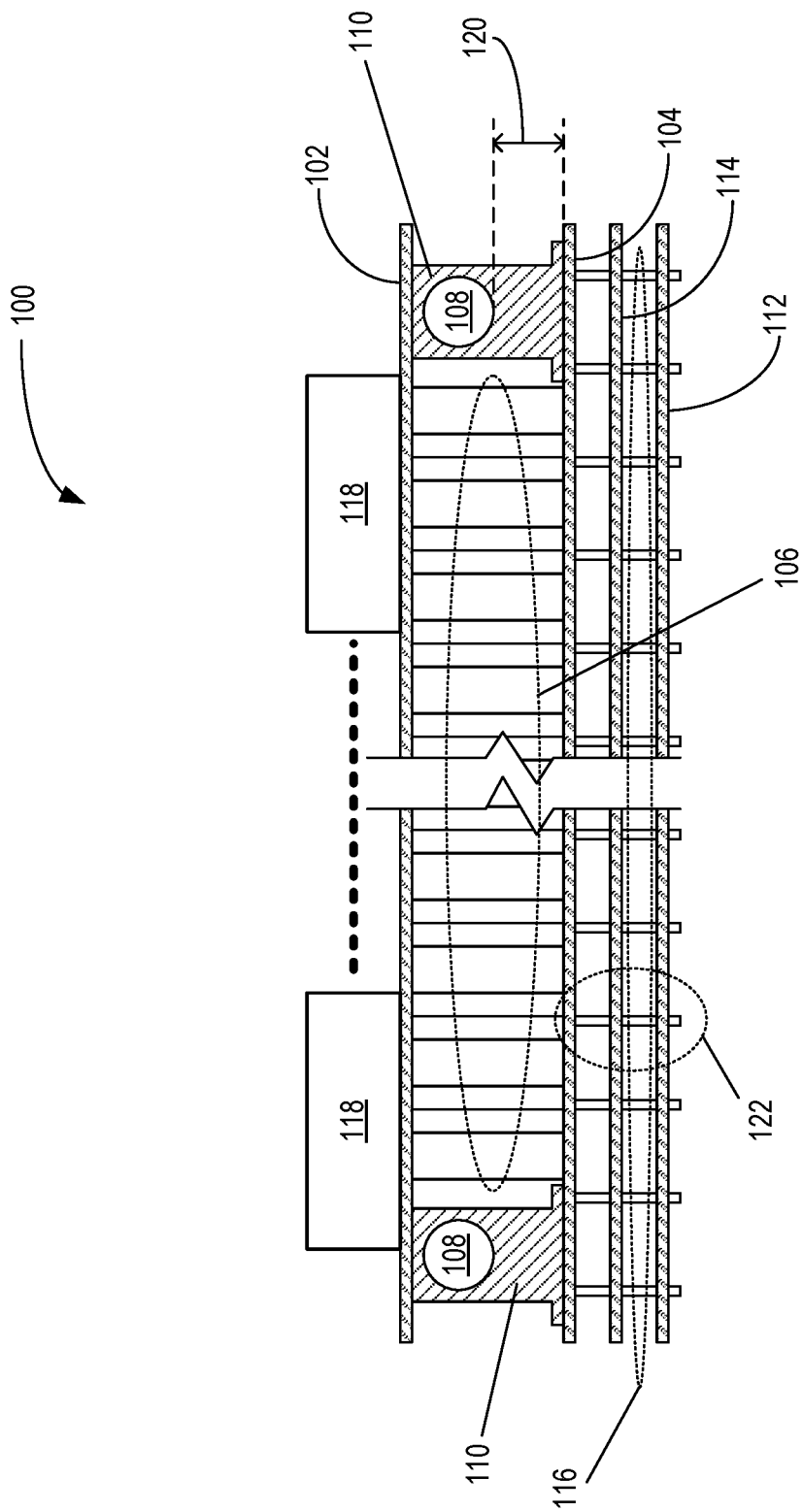
FIG. 1A is a side-view of an example of an implementation of a known spacecraft thermal control system.
Figure 1B:
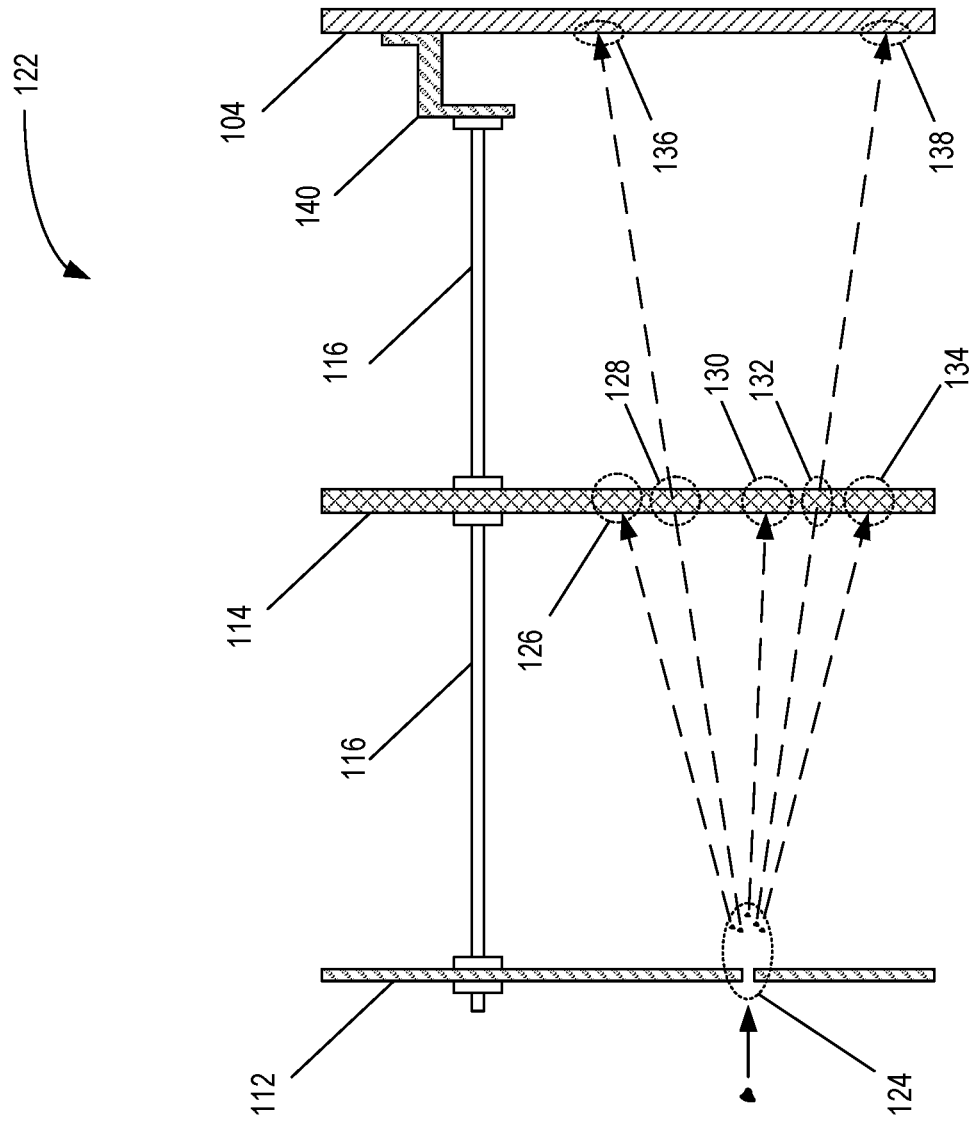
FIG. 1B is an expanded side-view of the outboard face-skin, shield, blanket, and plurality of standoffs shown in FIG. 1A.
Figure 2A:
FIG. 2A is a system block diagram of an implementation of a micrometeoroid and debris protection system (MDPS) for a thermal control system on a spacecraft in accordance with the present disclosure.
Figure 2B:
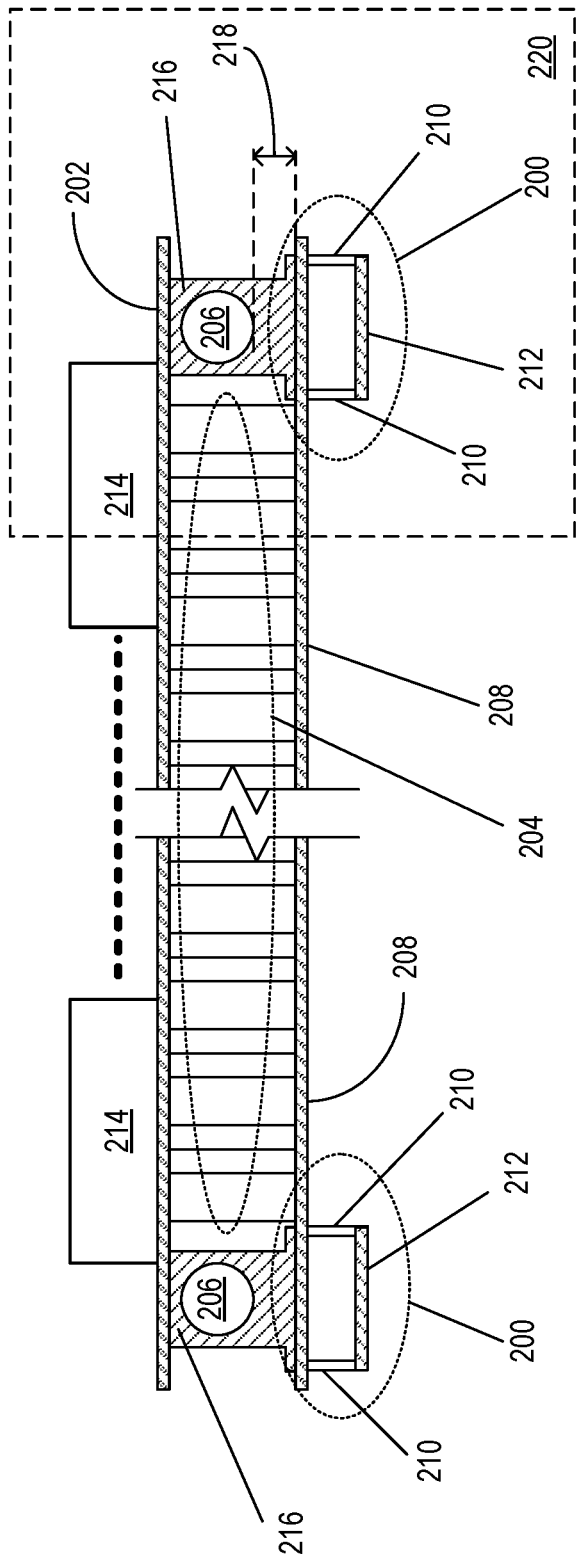
FIG. 2B is a side-view of an example of an implementation of the MDPS shown in FIG. 2A in accordance with the present disclosure.

FIG. 2A is a system block diagram of an implementation of a MDPS 200 for thermal control system(s) 201 on a spacecraft 203 in accordance with the present disclosure. Turning to FIG. 2B, a side-view of an example of an implementation of MDPS 200 is shown for a thermal control system on the spacecraft 203 in accordance with the present disclosure. The thermal control system 201 includes an in-board face-skin 202, honeycomb core 204, and heat-pipe(s) 206. The MDPS 200 comprises a radiator face-sheet 208 (i.e., an outboard face-skin), a truss 210 attached to the radiator face-sheet 208, and a thermally transparent bumper 212 disposed on the truss 210. In this example, the thermally transparent bumper 212 shields the radiator face-sheet 208 from micrometeoroids and debris and enables thermal transfer from the radiator face-sheet 208 through the thermally transparent bumper 212.

In this example, the spacecraft 203 includes a plurality of electronic devices 214 that are in physical and thermal contact with the in-board face-skin 202. The electronic devices 214 produce heat that is passed from the electronic devices 214 to the radiator face-sheet 208 via the heat-pipes 206 and corresponding heat-pipe spacers 216. The heat-pipes 206 are fluid channels that may be, for example, approximately ⅜ of an inch in diameter and the heat-pipe spacers 216 are metal parts that space the heat-pipes 206 away from the radiator face-sheet 208. As an example, the heat-pipe spacers 216 may be constructed of Al 6063-TS3 aluminum and have a spacing 218 between an inner surface of the radiator face-sheet 208 and the heat-pipe 206 of approximately about 0.050 inches. It is appreciated by those of ordinary skill in the art that the spacing 218 distance between the edge of the heat-pipe 206 and inner surface of the radiator face-sheet 208 is much smaller than previous known approaches resulting in a significant weight savings form the shorter heat-pipe spacers 216.

Figure 2C:
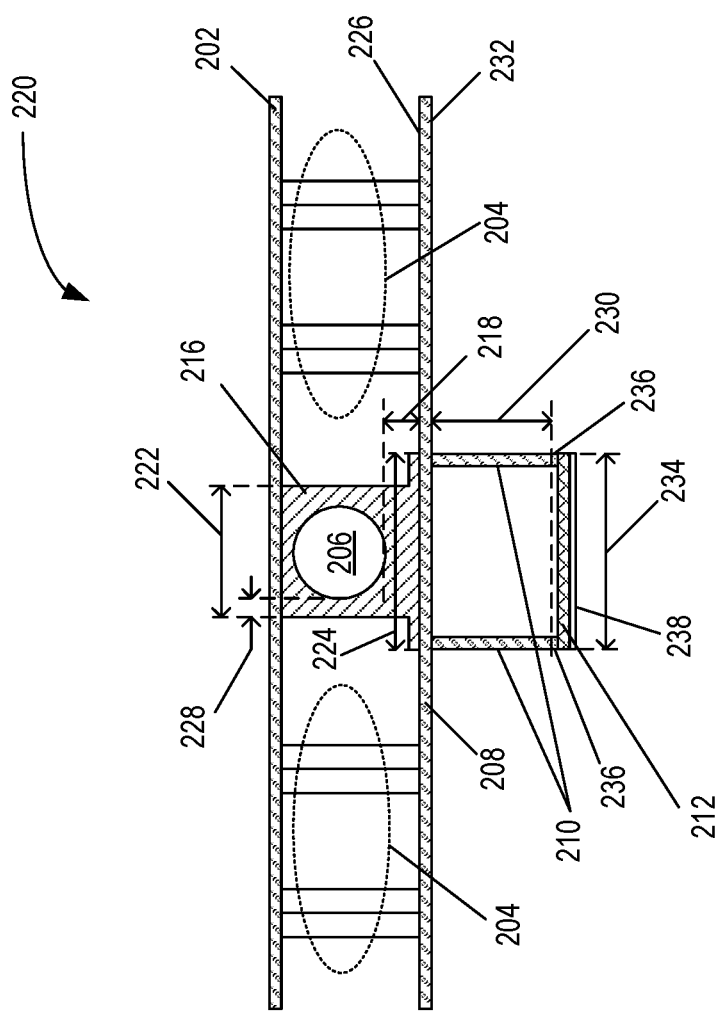
FIG. 2C is an expanded side-view of the radiator face-sheet, truss, heat-pipe spacer, and thermally transparent bumper shown in FIG. 2A.

FIG. 2C is an expanded side-view 220 of the radiator face-sheet 208, truss 210, heat-pipe spacer 216, and thermally transparent bumper 212. In this example, the heat-pipe spacer 216 is shown to have a top width 222 equal to approximately 0.475 inches and a bottom width 224 equal to approximately 0.875 inches. The bottom edge of the heat-pipe 206 is approximately 0.050 inches from the inner surface 226 of the radiator face-sheet 208 (i.e., spacing 218) and the side edge of the heat-pipe 206 is spaced 228 approximately 0.050 inches from the outside side edge of the heat-pipe spacer 216. In this example, the radiator face-sheet 208 may be a 0.01 inch thick plate of 2024-T81 aluminum.

The truss 210 may have a height 230 that is approximately 0.50 inches from an outer surface 232 of the radiator face-sheet 208 and the pair of truss sides of the truss 210 may be spaced 234 approximately 0.875 inches apart approximately matching the bottom width 224 of the heat-pipe spacer 216. In this example, the thermally transparent bumper 212 is bonded onto the truss 210 with a transparent adhesive 236 such as for example transparent DC93500 adhesive produced by Dow Corning of Midland, Michigan.

In this example, the truss 210 may be part of the radiator face-sheet 208 or mechanically attached to the radiator face-sheet 208 via bonding with adhesive or welded. If the truss 210 is part of the radiator face-sheet 208, the truss 210 may be machined into the outer surface 232 of the radiator face-sheet 208. The trusses 210 extend in a normal direction from the outer surface 232 of the radiator face-sheet 208. The truss 210 may also have a cross portion that connects the top of the sides of the truss 210 forming a "window frame" type of truss 210. Alternatively, the truss 210 may be part of a plurality of posts that extend in a normal direction from the outer surface 232 of the radiator face-sheet 208.

In this example, the thermally transparent bumper is an optically transparent bumper (OTB) that is optically transparent in an infra-red (IR) range of wavelengths, where the IR range of wavelengths may be approximately between 250 nanometers to 30,000 nanometers. The MDPS 200 may further include an IR coating 238 on the thermally transparent bumper 212 configured to prevent IR radiation impinging on the thermal control system 201.

Moreover, in this example, the heat-pipe 206, of the thermal control system 201, is attached to the inner surface 226 of the radiator face-sheet 208, where the combination of the truss 210 and thermally transparent bumper 212 is located on the outer surface 232 of the radiator face-sheet 208 opposite the heat-pipe 206 within the heat-pipe spacer 216. Furthermore, the combination of the truss 210 and the thermally transparent bumper 212 is colinear with the heat-pipe 206 and heat-pipe spacer 216. As such, the MDPS 200 provides protection for the heat-pipe 206 from impacts of micrometeoroid or debris.

In these examples, the MDPS 200 has been described as a system that protects the heat-pipes 206 of the thermal control system 201 from potential puncture damage caused by the impacts of micrometeoroid or debris against the spacecraft 203. However, the MDPS 200 is also a system that is thermally transparent to the thermal radiation produced by the radiator face-sheet 208.

In general, the plurality of electronic devices 214 produce heat that is thermally conducted to the heat-pipes 206 via the in-board face-skin 202 and heat-pipe spacers 216. The heat-pipes 206 receive the heat from the plurality of electronic devices 214 and move it along the thermal control system 201 via fluids flowing through heat-pipes 206. The heat is then thermally conducted to the inner surface 226 of the radiator face-sheet 208 and then thermally conducted to the outer surface 232 of the radiator face-sheet 208 where the heat is radiated into outer space. Generally, the radiation of this heat from the radiator face-sheet 208 is radiated as IR energy in the approximately between 250 nanometers to 30,000 nanometers. As such, the thermally transparent bumper 212 is designed and configured to be transparent to this IR energy to allow the radiated heat from the radiator face-sheet 208 to dissipate into outer space from the spacecraft 203.

It is appreciated by those of ordinary skill in the art, that in addition heat generated by the onboard devices (such as, for example, the plurality of electronic devices 214), the spacecraft 203 also receives heat from impinging solar energy that illuminates the spacecraft 203. In order to minimize the heat generated by this solar energy, the radiator face-sheet 208 may be coated or painted with reflective or non-absorbing materials or paint. In this example, the truss 210 may be painted white (broad spectrum reflective) and configured to reflect the IR radiation form the solar energy illuminating the spacecraft 203.

It is also appreciated by those of ordinary skill in the art, the elements of the MDPS 200 and thermal control system 201 are for illustrative purpose and not drawn to scale. Additionally, while the plurality of electronic devices 214 are shown as being positioned on in-board face-skin 202 at location close to the MDPS 200, this is for illustrative purpose only and it is appreciated that the plurality of electronic devices 214 may be located at different payload locations within the spacecraft 203 (that may be, for example, a satellite) that are in thermal communication with the heat-pipes 206 of the thermal control system 201. These heat-pipes 206 may be routed throughout different parts of the spacecraft 203 carry and distributing the internally generated heat to heat radiating portions (i.e., radiators) of the spacecraft 203. These radiators are specifically designed to receive the thermally transmitted heat from the heat-pipes 206 and radiate the received heat through radiator face-sheet 208. Since the heat-pipe 206 portions are closest (for example, 0.050 inch) to the external skin (i.e., the radiator face-sheet 208) of the spacecraft 203 at the radiators, the MDPS 200 is located at the radiators at positions opposite the location of the heat-pipe spacers 216. As a result, the MDPS 200 is configured to protect the heat-pipe 206 from punctures caused by the impacts of micrometeoroid or debris against the spacecraft 203 at the radiators.

Figure 3C:
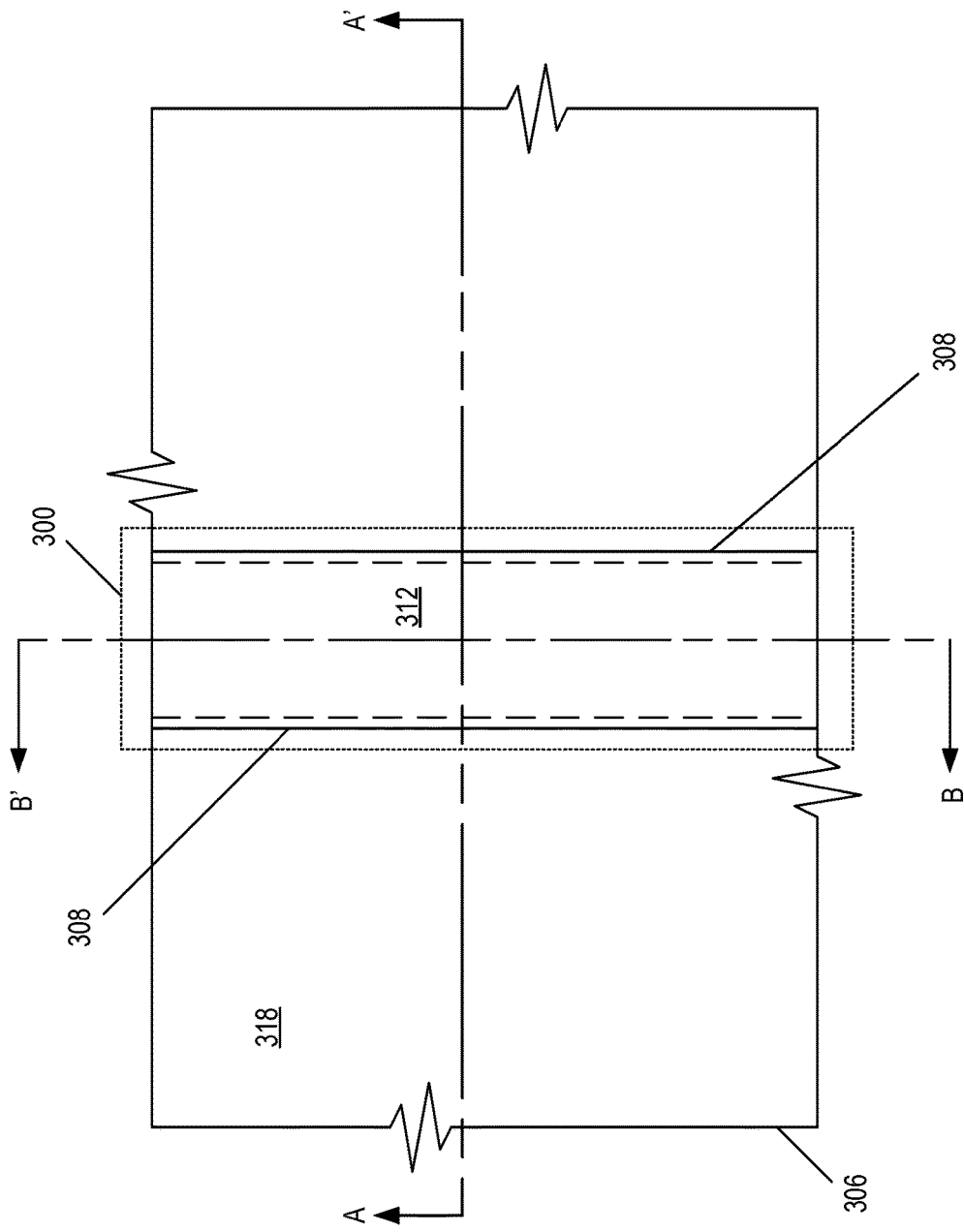
FIG. 3C is a bottom view of the MDPS shown in FIGS. 3A and 3B in accordance with the present disclosure.

Turning to FIG. 3A, a front-view of the MDPS 300 is shown in accordance with the present disclosure. In this example, for ease of illustration only the heat-pipe spacer 302, heat pipe 304, and radiator face-sheet 306 are shown in relation to the MDPS 300. The MDPS 300 includes a truss 308, thermally transparent bumper 310, an IR coating 312, and a transparent adhesive 314. As described above, the bottom of the heat-pipe spacer 302 is physically attached to the inner surface 316 of the radiator face-sheet 306 and the truss 308 is part of, or attached to, the outer surface 318 of the radiator face-sheet 306. In FIG. 3B, a side-view of the MDPS 300 is shown and in FIG. 3C, a bottom view of the MDPS 300 is shown in accordance with the present disclosure. In this example, FIG. 3A is a front-view along a cutting plane AA' and FIG. 3B is a side-view along a cutting plane BB', respectively. It is appreciated by those of ordinary skill in the art that, in this example, the MDPS 300 extends along most of the length of the heat-pipe spacer 302. However, the figures are not to scale so the MDPS 300 may extend a length that is optionally less than or greater than the length of the heat-pipe spacer 302 based on the design of the radiators on the spacecraft 203. In this example, the truss 308 optionally extends the length of the MDPS 300. However, the truss 308 may also only extend a portion of the length of the MDPS 300.

Figure 4A:
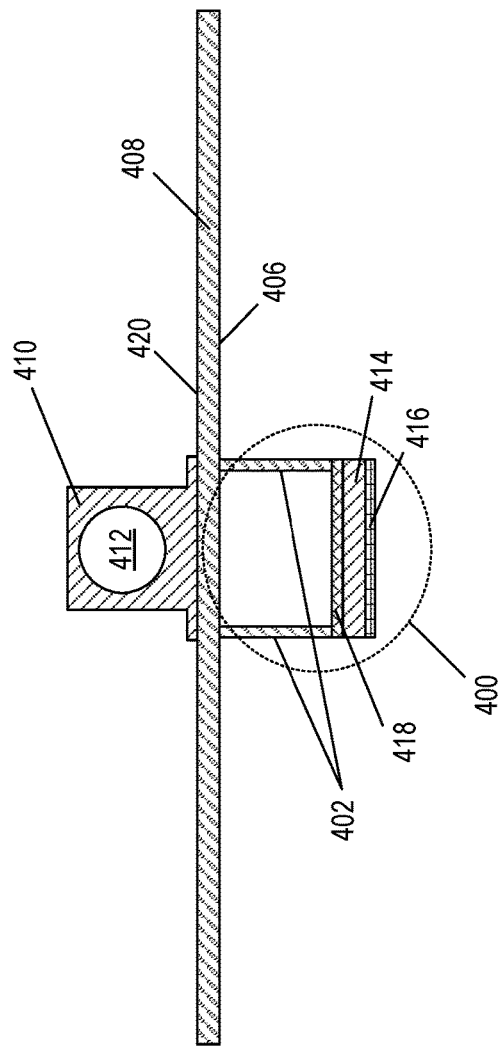
FIG. 4A is a top view of an example of another implementation of the MDPS shown in FIG. 2 in accordance with the present disclosure.
Figure 4B:
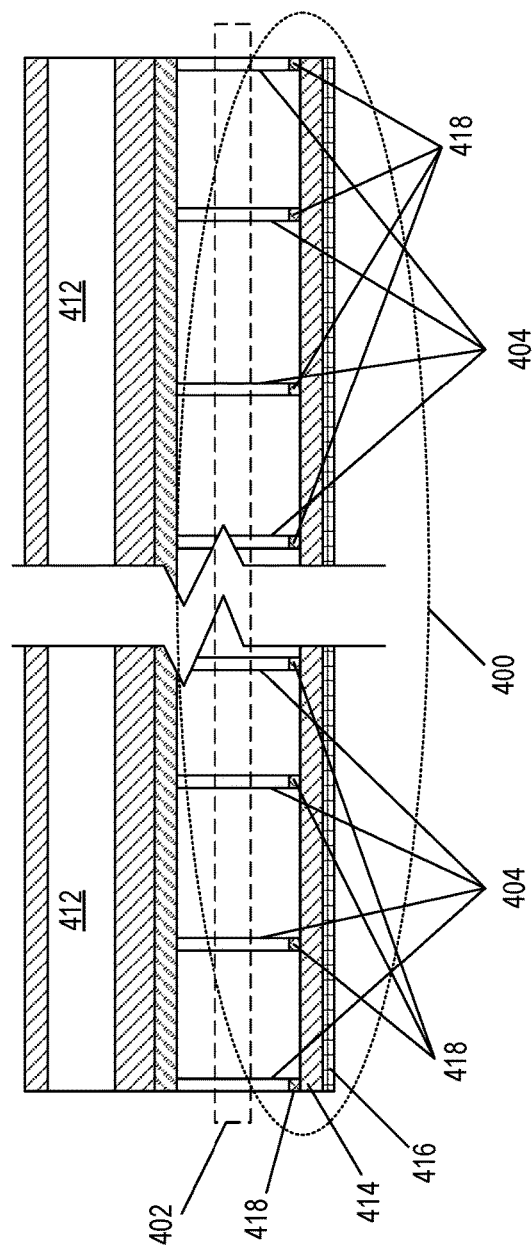
FIG. 4B is a front-view of the MDPS shown in FIG. 4A in accordance with the present disclosure.

In FIG. 4A, a top view of an example of another implementation of the MDPS 400 is shown in accordance with the present disclosure. Instead of the truss 308 shown in relation to FIGS. 3A-3C, in this example, the MDPS 400 is shown to include a truss 402 that includes a plurality of posts 404, where each post 404 extends in a normal direction from an outer surface 406 of the radiator face-sheet 408. In FIG. 4A, a front-view of the MDPS 400 is shown and in FIG. 4B, a side-view of the MDPS 400 is shown in accordance with the present disclosure. In this example, FIG. 4A is a front-view along a cutting plane AA' and FIG. 4B is a side-view along a cutting plane BB', respectively. Similar to the example described in relation to FIGS. 3A-3C, in this example, for ease of illustration only the heat-pipe spacer 410, heat-pipe 412, and the radiator face-sheet 408 are shown in relation to the MDPS 400. The MDPS 400 includes the truss 402, thermally transparent bumper 414, an IR coating 416, and a transparent adhesive 418. As described above, the bottom of the heat-pipe spacer 410 is physically attached to the inner surface 420 of the radiator face-sheet 408 and the truss 402 is part of, or attached to, the outer surface 406 of the radiator face-sheet 408.

Figure 5:
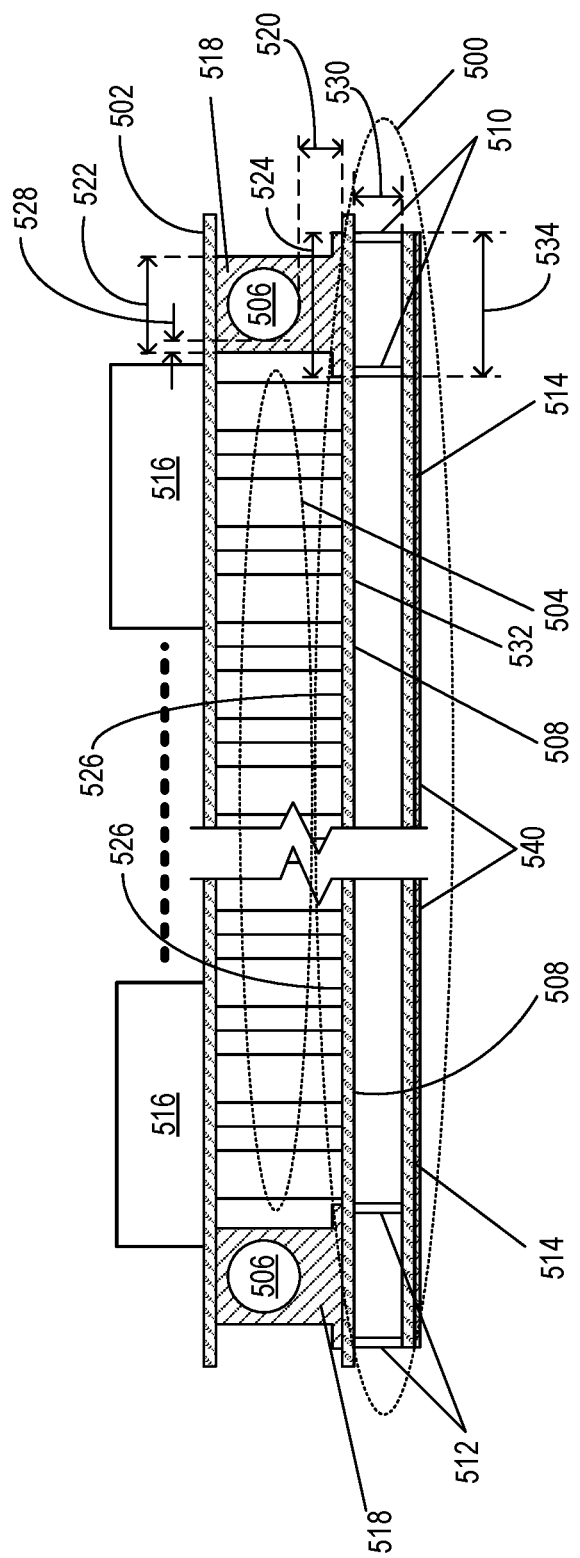
FIG. 5 is a side-view of an example of another implementation of a MDPS for a thermal control system on a spacecraft in accordance with the present disclosure.

Turning to FIG. 5, a side-view of an example of another implementation of a MDPS 500 for a thermal control system 201 on a spacecraft 203 is shown in accordance with the present disclosure. Similar to the previous example described in relation to FIGS. 2A and 2B, the thermal control system 201 includes an in-board face-skin 502, honeycomb core 504, and heat-pipe(s) 506. The MDPS 500 comprises a radiator face-sheet 508 (i.e., an outboard face-skin), a first truss 510 and a second truss 512 attached to the radiator face-sheet 508, and a thermally transparent bumper 514 disposed on the first truss 510 and second truss 512. In this example, the thermally transparent bumper 514 extends at least between the first truss 510 and 512 and shields the radiator face-sheet 508 from micrometeoroids and debris and enables thermal transfer from the radiator face-sheet 508 through the thermally transparent bumper 514.

In this example, the spacecraft 203 includes a plurality of electronic devices 516 that are in physical and thermal contact with the in-board face-skin 502. The electronic devices 516 produce heat that is passed from the electronic devices 516 to the radiator face-sheet 508 via the heat-pipes 506 and corresponding heat-pipe spacers 518. Again, the heat-pipes 506 are fluid channels that may be, for example, approximately ⅜ of an inch in diameter and the heat-pipe spacers 518 are metal parts that space the heat-pipes 506 away from the radiator face-sheet 508. As an example, the heat-pipe spacers 518 may be constructed of Al 6063-TS3 aluminum and have a spacing 520 between an inner surface of the radiator face-sheet 508 and the heat-pipe 506 of approximately about 0.050 inches. It is again appreciated by those of ordinary skill in the art that the spacing 520 distance between the edge of the heat-pipe 506 and inner surface of the radiator face-sheet 508 is much smaller than previous known approaches resulting in a significant weight savings form the shorter heat-pipe spacers 518.

Similar to the example described in relation to FIG. 2B, in this example, the heat-pipe spacer 518 may have a top width 522 equal to approximately 0.475 inches and a bottom width 524 equal to approximately 0.875 inches. The bottom edge of the heat-pipe 506 is approximately 0.050 inches from the inner surface 526 of the radiator face-sheet 508 (i.e., spacing 520) and the side edge of the heat-pipe 506 is spaced 528 approximately 0.050 inches from the outside side edge of the heat-pipe spacer 518. In this example, the radiator face-sheet 508 may be again a 0.01 inch thick plate of 2024-T81 aluminum.

The first truss 510 and second truss 512 may each have a height 530 that is approximately 0.50 inches from an outer surface 532 of the radiator face-sheet 508 and the pair of individual truss sides of the first truss 510 (or the second truss 512) may be spaced 534 approximately 0.875 inches apart approximately matching the bottom width 524 of the heat-pipe spacer 518. In this example, the thermally transparent bumper 514 is bonded onto the first truss 510 and second truss 512 with a transparent adhesive such as, for example, transparent DC93500 adhesive.

Figure 4C:
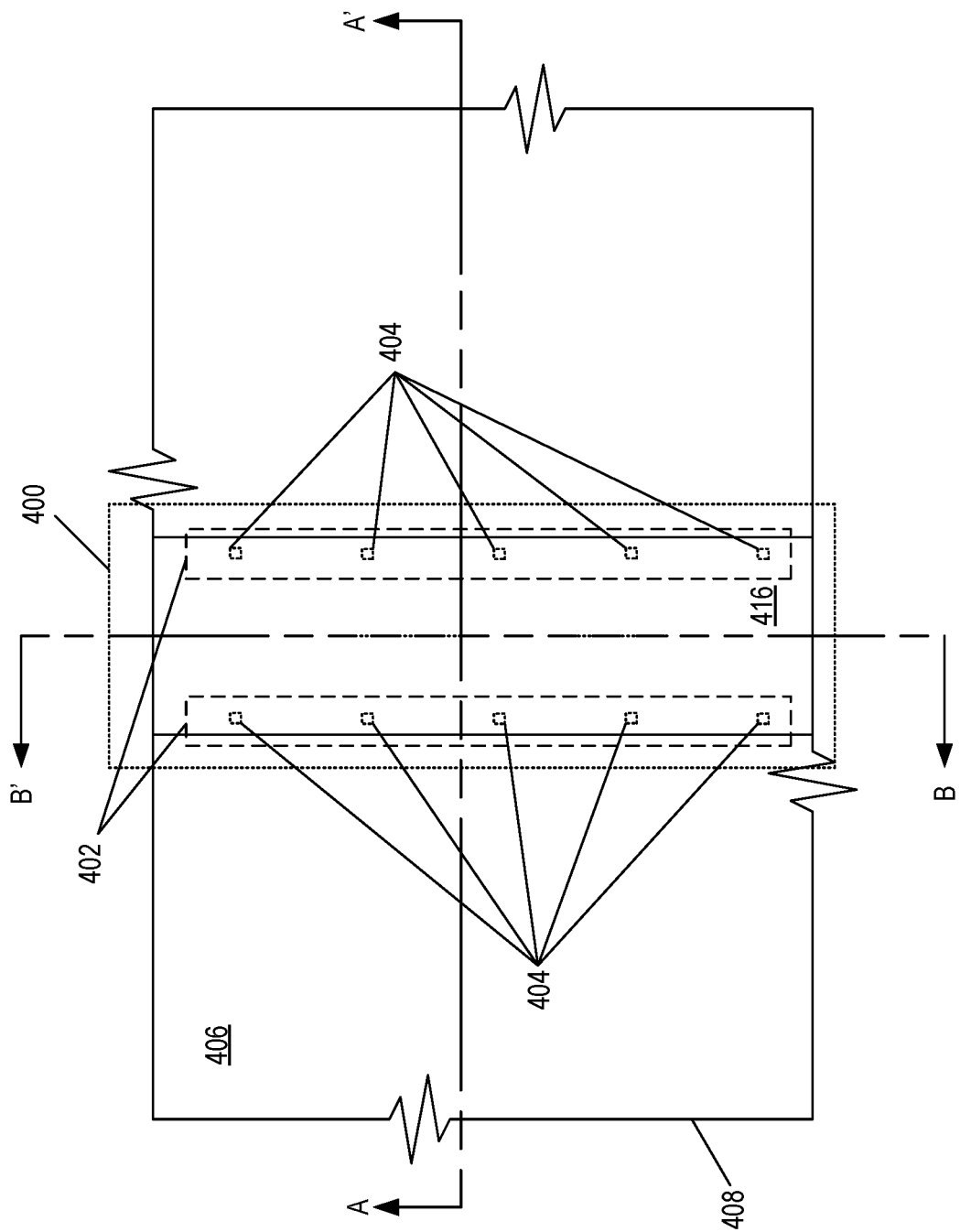
FIG. 4C is a side-view of the MDPS shown in FIGS. 4A and 4B in accordance with the present disclosure.

As described above, in this example, the first truss 510 and second truss 512 may be part of the radiator face-sheet 508 or mechanically attached to the radiator face-sheet 508 via bonding with adhesive or welded. If the first truss 510 and second truss 512 are part of the radiator face-sheet 508, the first truss 510 and second truss 512 may be machined into the outer surface 532 of the radiator face-sheet 508. The first truss 510 and second truss 512 extend in a normal direction from the outer surface 532 of the radiator face-sheet 508. The first truss 510 and second truss 512 may also have a cross portion that connects the top of the first truss 510 and second truss 512 forming a "window frame" type of first truss 510 and second truss 512. Alternatively, the first truss 510 and second truss 512 may be part of a plurality of posts that extend in a normal direction from the outer surface 532 of the radiator face-sheet 508 similar to the post shown and described in relation to FIGS. 4A-4C.

In this example, the thermally transparent bumper 514 is an OTB that is optically transparent in an IR range of wavelengths, where the IR range of wavelengths may be approximately between 250 nanometers to 30,000 nanometers. The MDPS 500 may further include an IR coating 540 on the thermally transparent bumper 514 configured to prevent IR radiation impinging on the thermal control system 201.

The MDPS 500 provides protection for the heat-pipes 506 from potential puncture damage caused by the impacts of micrometeoroid or debris against the spacecraft 203. However, the MDPS 500 is also a system that is thermally transparent to the thermal radiation produced by the radiator face-sheet 508.

In general, the plurality of electronic devices 516 produce heat that is thermally conducted to the heat-pipes 506 via the in-board face-skin 502 and heat-pipe spacers 518. The heat-pipes 506 receive the heat from the plurality of electronic devices 516 and move it along the thermal control system 201 via fluids flowing through heat-pipes 506. The heat is then thermally conducted to the inner surface 526 of the radiator face-sheet 508 and then thermally conducted to the outer surface 532 of the radiator face-sheet 508 where the heat is radiated into outer space. Generally, the radiation of this heat from the radiator face-sheet 508 is radiated as IR energy in the approximately between 250 nanometers to 30,000 nanometers. As such, the thermally transparent bumper 514 is designed and configured to be transparent to this IR energy to allow the radiated heat from the radiator face-sheet 508 to dissipate into outer space from the spacecraft 203.

Figure 6:
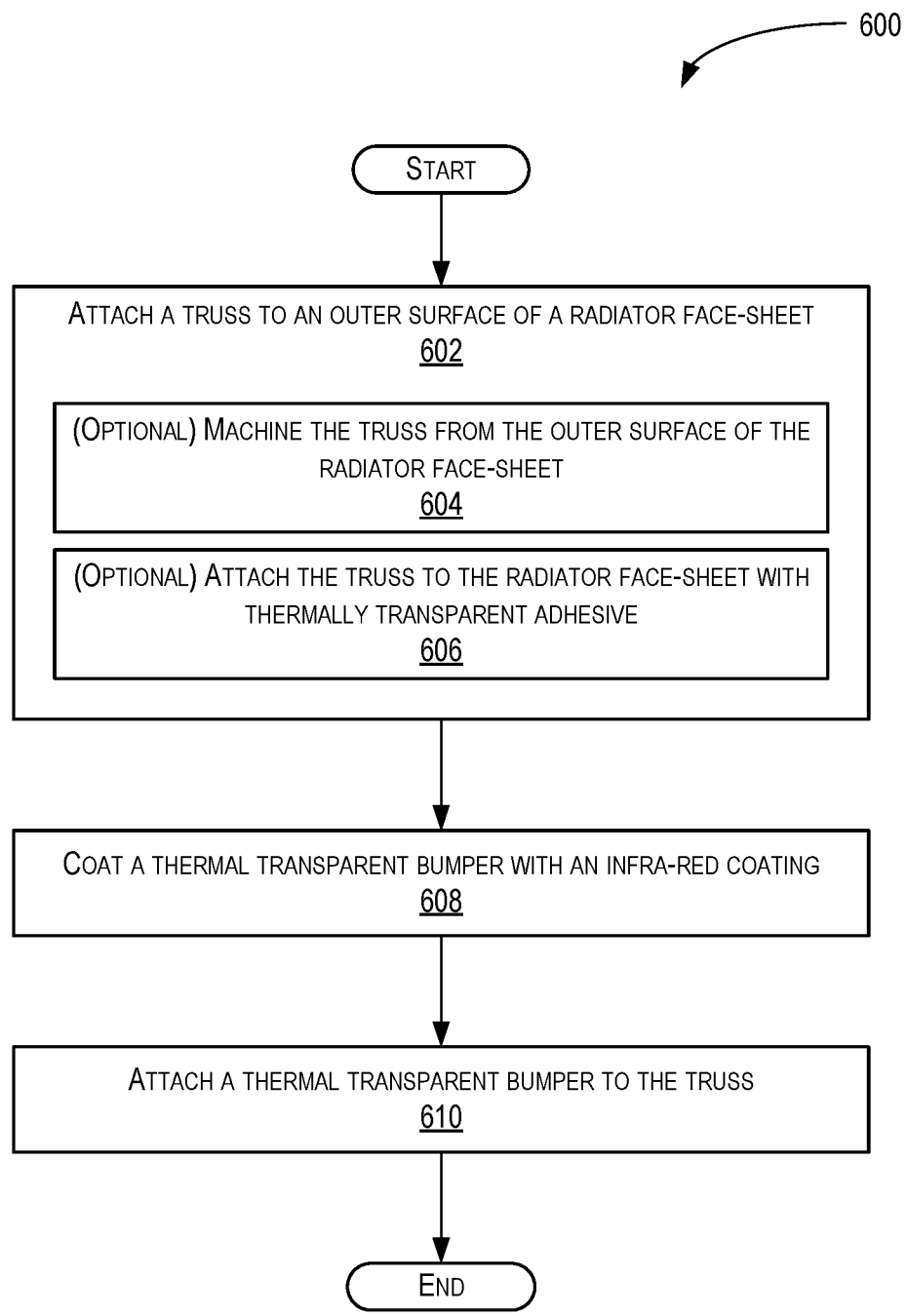
FIG. 6 is a flow chart depicting a method for manufacturing a micrometeroid and debris protection system in accordance with the present disclosure.

Turning to FIG. 6, a flow chart depicting a method 600 for manufacturing the MDPS 200, 300, 400, or 500 is shown in accordance with the present disclosure. The method 600 includes attaching 602 a truss 210, 308, or 402 to the outer surface 232, 406, or 532 of the radiator face-sheet 208, 306, 408, or 508. In this example, the step of attaching 602 the truss may optionally include machining 604 the truss 210, 308, or 402 from the outer surface 232, 406, or 532 of the radiator face-sheet 208, 306, 408, or 508 or attaching 606 the thermally transparent bumper 212, 414, or 514 to the truss 210, 308, or 402 with the thermally transparent adhesive 236, 314, or 418. The method 600 further includes coating 608 the thermally transparent bumper 236, 314, or 418 with the infra-red coating 238, 312, or 416 that is configured to prevent infra-red radiation impinging on the thermal control system 201 and attaching 610 the thermally transparent bumper 212, 414, or 514 on to the truss 210, 308, or 402.

It is appreciated by those of ordinary skill in the art, that in addition heat generated by the onboard devices (such as, for example, the plurality of electronic devices 516), the spacecraft 203 also receives heat from impinging solar energy that illuminates the spacecraft 203. In order to minimize the heat generated by this solar energy, the radiator face-sheet 508 may be coated or painted with reflective or non-absorbing materials or paint. In this example, the first truss 510 and second truss 512 may be (e.g. painted) white or having a white coating or white surface and configured to broadly reflect the IR radiation form the solar energy illuminating the spacecraft 203.

It is also appreciated by those of ordinary skill in the art, the elements of the MDPS 500 and thermal control system 201 are for illustrative purpose and not drawn to scale. Additionally, while the plurality of electronic devices 516 are shown as being positioned on in-board face-skin 502 at location close to the MDPS 500, this is for illustrative purpose only and it is appreciated that the plurality of electronic devices 516 may be located at different payload locations within the spacecraft 203 (that may be, for example, a satellite) that are in thermal communication with the heat-pipes 506 of the thermal control system 201. These heat-pipes 506 may be routed throughout different parts of the spacecraft 203 carry and distributing the internally generated heat to heat radiating portions (i.e., radiators) of the spacecraft 203. These radiators are specifically designed to receive the thermally transmitted heat from the heat-pipes 506 and radiate the received heat through radiator face-sheet 508. Since the heat-pipe 506 portions are closest (for example, 0.050 inch) to the external skin (i.e., the radiator face-sheet 508) of the spacecraft 203 at the radiators, the MDPS 500 is located at the radiators at positions approximately opposite the location of the heat-pipe spacers 518. As a result, the MDPS 500 is configured to protect the heat-pipe 506 from punctures caused by the impacts of micrometeoroid or debris against the spacecraft 201 at the radiators.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following examples.

Example 1. A micrometeoroid and debris protection system (MDPS) for a thermal control system on a spacecraft, the MDPS comprising: a radiator face-sheet; a truss attached to the radiator face-sheet; and a thermally transparent bumper disposed on the truss, such that the thermally transparent bumper shields the radiator face-sheet from micrometeoroids and debris and enables thermal transfer from the radiator face-sheet through the thermally transparent bumper.

Example 2. The MDPS of example 1, wherein the truss is part of the radiator face-sheet.

Example 3. The MDPS of example 2, wherein the truss includes a plurality of posts, wherein each post extends in a normal direction from an outer surface of the radiator face-sheet.

Example 4. The MDPS of example 2, wherein the truss is machined into an outer surface of the radiator face-sheet.

Example 5. The MDPS of example 1, wherein the thermally transparent bumper is attached to the truss with thermally transparent adhesive.

Example 6. The MDPS of example 1, wherein the thermally transparent bumper is an optically transparent bumper (OTB) that is optically transparent in an infra-red range of wavelengths.

Example 7. The MDPS of example 6, wherein the infrared range of wavelengths is approximately between 250 nanometers to 30,000 nanometers.

Example 8. The MDPS of example 1, further including a heat-pipe, of the thermal control system, attached to an inner surface of the radiator face-sheet, wherein a combination of the truss and thermally transparent bumper is located on an outer surface of the radiator face-sheet opposite the heat-pipe.

Example 9. The MDPS of example 8, wherein the combination of the truss and the thermally transparent bumper is colinear with the heat-pipe.

Example 10. The MDPS of example 1, further including an infra-red coating on the thermally transparent bumper configured to prevent infra-red radiation impinging on the thermal control system.

Example 11. The MDPS of example 10, wherein the truss is white and configured to reflect the infra-red radiation.

Example 12. A method for manufacturing a micrometeoroid and debris protection system (MDPS) for thermal control systems on a spacecraft, the method comprising: attaching a truss to an outer surface of a radiator face-sheet, wherein the radiator face-sheet includes an inner surface attached to the thermal control system and the truss is positioned opposite a location of the thermal control system; and attaching a thermally transparent bumper on to the truss.

Example 13. The method of example 12, further including coating the thermally transparent bumper with an infra-red coating that is configured to prevent infra-red radiation impinging on the thermal control system.

Example 14. The method of example 12, wherein attaching the truss includes machining the truss from an outer surface of the radiator face-sheet.

Example 15. The method of example 12, wherein attaching the thermally transparent bumper includes attaching the thermally transparent bumper to the truss with a thermally transparent adhesive.

Example 16. A micrometeoroid and debris protection system (MDPS) for a thermal control system on a spacecraft, the thermal control system having a first heat-pipe and a second heat-pipe, the MDPS comprising: a radiator face-sheet having an inner surface, wherein the first heat-pipe and the second heat-pipe are attached to the inner surface of the radiator face-sheet; a first truss and a second truss attached to an outer surface of the radiator face-sheet; and a first thermally transparent bumper disposed on the first truss and a second thermally transparent bumper disposed on the second truss, wherein the first thermally transparent bumper and second thermally transparent bumper shield the radiator face-sheet from micrometeoroids and debris and enables thermal transfer from the radiator face-sheet through the first thermally transparent bumper and second thermally transparent bumper.

Example 17. The MDPS of example 16, wherein a combination of the first truss and first thermally transparent bumper is located on the outer surface of the radiator face-sheet opposite the first heat-pipe and a combination of the second truss and second thermally transparent bumper is located on the outer surface of the radiator face-sheet opposite the second heat-pipe.

Example 18. The MDPS of example 17, wherein the first thermally transparent bumper and the second thermally transparent bumper are part of a single thermally transparent bumper that is a solid sheet of material.

Example 19. The MDPS of example 17, wherein the first truss and the second truss are part of the radiator face-sheet.

Example 20. The MDPS of example 17, further including an infra-red coating on the first thermally transparent bumper and the second thermally transparent bumper, wherein the infra-red coating is configured to prevent infra-red radiation impinging on the thermal control system.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed:

1. A micrometeoroid and debris protection system for a thermal control system on a spacecraft, the system comprising:

a radiator face-sheet;
a truss extending from an outward surface of the radiator face-sheet; and
a thermally transparent bumper disposed on the truss, comprising:
a first surface, oriented away from the radiator face-sheet, configured to reflect radiation from space, and
a second surface, oriented toward the radiator face-sheet, that is thermally transparent to heat energy radiated from the radiator face-sheet, wherein the heat energy from the radiator face-sheet is configured to radiate away from the radiator face-sheet through the thermally transparent bumper.

2. The system of claim 1, wherein the truss is part of the radiator face-sheet.

3. The system of claim 2, wherein the truss includes a plurality of posts, wherein each post extends in a normal direction from an outer surface of the radiator face-sheet.

4. The system of claim 2, wherein the truss is machined into an outer surface of the radiator face-sheet.

5. The system of claim 1, wherein the thermally transparent bumper is attached to the truss with thermally transparent adhesive.

6. The system of claim 1, wherein the thermally transparent bumper is an optically transparent bumper that is optically transparent in an infra-red range of wavelengths; and
wherein the truss extends in a normal direction from the outward surface of the radiator face-sheet.

7. The system of claim 1, wherein:
the radiator face-sheet radiates infra-red energy over a range of wavelengths of approximately 250 nanometers to 30,000 nanometers, and
the thermally transparent bumper is transparent to wavelengths approximately between 250 nanometers to 30,000 nanometers in accordance with the range of wavelengths of the infra-red energy radiated by the radiator face-sheet.

8. The system of claim 1, further including a heat-pipe, of the thermal control system, attached to an inner surface of the radiator face-sheet, wherein a combination of the truss and thermally transparent bumper is located on an outer surface of the radiator face-sheet opposite the heat-pipe; and
wherein the thermally transparent bumper shields the radiator face-sheet from micrometeoroids and debris capable of causing a fluid leak from the heat-pipe.

9. The system of claim 8, wherein the combination of the truss and the thermally transparent bumper is colinear with the heat-pipe.

10. The system of claim 1, further including an infra-red coating on the thermally transparent bumper configured to prevent infra-red radiation impinging on the thermal control system,
wherein the outward surface of the radiator face-sheet continuously extends to a juncture with the truss and beyond the juncture with the truss.

11. The system of claim 10, further including an infra-red coating on the thermally transparent bumper configured to prevent infra-red radiation impinging on the thermal control system,
wherein the truss is white and configured to reflect the infra-red radiation.

12. A method for manufacturing a micrometeoroid and debris protection system for a thermal control system on a spacecraft, the method comprising:
providing a truss to extend from an outer surface of a radiator face-sheet, wherein the radiator face-sheet includes an inner surface attached to the thermal control system and the truss is positioned opposite a location of the thermal control system; and attaching a thermally transparent bumper on to the truss, the thermally transparent bumper comprising:
- a first surface, oriented away from the radiator face-sheet, configured to reflect radiation from space, and
- a second surface, oriented toward the radiator face-sheet, that is thermally transparent to heat energy radiated from the radiator face-sheet, wherein the heat energy from the radiator face-sheet is configured to radiate away from the radiator face-sheet through the thermally transparent bumper.

13. The method of claim 12, further comprising:
coating the thermally transparent bumper with an infra-red coating that is configured to prevent infra-red radiation impinging on the thermal control system.

14. The method of claim 12, wherein providing the truss includes machining the truss from the outer surface of the radiator face-sheet.

15. The method of claim 12, wherein attaching the thermally transparent bumper includes attaching the thermally transparent bumper to the truss with a thermally transparent adhesive.

16. A micrometeoroid and debris protection system for a thermal control system on a spacecraft, the thermal control system having a first heat-pipe and a second heat-pipe, the system comprising:
- a radiator face-sheet having an inner surface, wherein the first heat-pipe and the second heat-pipe are attached to the inner surface of the radiator face-sheet;
- a first truss and a second truss attached to an outer surface of the radiator face-sheet; and
- a first thermally transparent bumper disposed on the first truss and a second thermally transparent bumper disposed on the second truss, at least one of the first thermally transparent bumper or the second thermally transparent bumper comprising:
  - a first surface, oriented away from the radiator face-sheet, configured to reflect radiation from space, and
  - a second surface, oriented toward the radiator face-sheet, that is thermally transparent to heat energy radiated from the radiator face-sheet, wherein the heat energy from the radiator face-sheet is configured to radiate away from the radiator face-sheet through the at least one of the first thermally transparent bumper or the second thermally transparent bumper.

17. The system of claim 16, wherein a combination of the first truss and the first thermally transparent bumper is located on the outer surface of the radiator face-sheet opposite the first heat-pipe and a combination of the second truss and the second thermally transparent bumper is located on the outer surface of the radiator face-sheet opposite the second heat-pipe.

18. The system of claim 17, wherein the first thermally transparent bumper and the second thermally transparent bumper are part of a single thermally transparent bumper that is a solid sheet of material.

19. The system of claim 17, wherein the first truss and the second truss are part of the radiator face-sheet.

20. The system of claim 17, further including an infra-red coating on the first thermally transparent bumper and the second thermally transparent bumper, wherein the infra-red coating is configured to prevent infra-red radiation impinging on the thermal control system.

\* \* \* \* \*